United States Patent
Nobusawa

[15] 3,683,766
[45] Aug. 15, 1972

[54] AUTOMATIC EXPOSURE TIME CONTROL FOR CAMERAS

[72] Inventor: Tsukumo Nobusawa, Tokyo-to, Japan

[73] Assignee: Asahi Kogaku kogyo Kabushiki Kaisha, Tokyo-to, Japan

[22] Filed: Feb. 16, 1970

[21] Appl. No.: 11,405

[30] Foreign Application Priority Data

Feb. 24, 1969 Japan ..................... 44/13182

[52] U.S. Cl. ............... 95/10 CT, 95/42, 95/43 EB
[51] Int. Cl. ........................ G03b 7/08, G03b 9/62
[58] Field of Search ............ 95/10 C, 53 E, 53 R, 42

[56] References Cited

UNITED STATES PATENTS

| | | |
|---|---|---|
| 3,232,192 | 2/1966 | Stimson ..................... 95/10 C |
| 3,349,678 | 10/1967 | Minoru Suzuici et al. ........................ 95/10 C |
| 3,397,629 | 8/1968 | Tadamichi Mori et al. ........................ 95/10 C |
| 3,418,479 | 12/1968 | Schmitt ..................... 95/10 C |
| 3,473,453 | 10/1969 | Gross ....................... 95/10 C |
| 3,503,314 | 3/1970 | Yasuo Tanabe .......... 95/10 C |
| 3,353,462 | 11/1967 | Suzuici .................... 95/10 CT |

*Primary Examiner*—Joseph F. Peters, Jr.
*Attorney*—Steinberg & Blake

[57] ABSTRACT

A camera capable of automatically determining exposure time. The camera includes an external photosensitive element for receiving light which is external to the camera objective and an internal photosensitive element for receiving light which has passed through the objective internally thereof. A relatively simple electrical control structure is actuated by the external photosensitive element to determine the exposure time. Simultaneously, a compensating signal is derived from the internal photosensitive element to compensate for inaccuracies inherent in the exposure time determination which would result from the influence of the external photosensitive element along.

11 Claims, 10 Drawing Figures

PATENTED AUG 15 1972

INVENTOR
TSUKUMO NOBUSAWA
BY
Steinberg + Blake
ATTORNEYS

INVENTOR
TSUKUMO NOBUSAWA
BY
Steinberg + Blake
ATTORNEYS

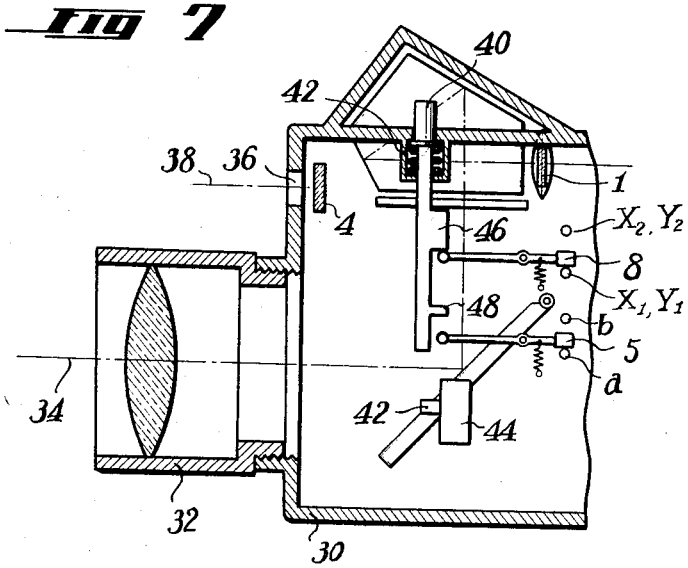
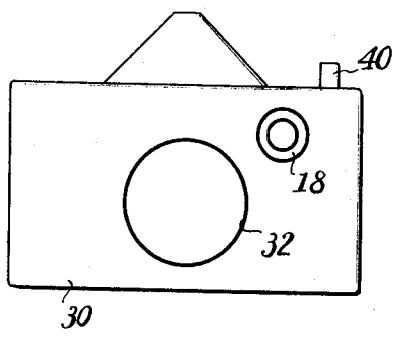
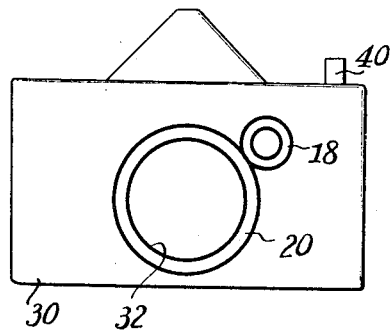
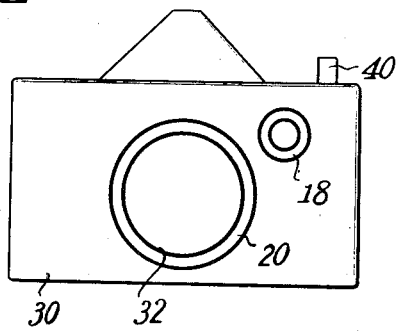

AUTOMATIC EXPOSURE TIME CONTROL FOR CAMERAS

BACKGROUND OF THE INVENTION

The invention relates to cameras, and particularly to cameras of the single lens reflex type provided with an internal photosensitive element which receives light which has passed through the objective in order to determine automatically a factor such as the proper exposure time.

Cameras of this latter general type are well known and are considered to be highly desirable because the light which is received by the internal photosensitive element has passed through the objective and is consequently the same light which is received by the film when the latter is exposed, so that in this way an extremely high degree of accuracy can be achieved in the automatic exposure determination.

Of course it is also possible to determine the exposure by way of a photosensitive element which receives light which is external to the objective.

It is well known that these two types of light-responsive structures have their own advantages and disadvantages, so that quite often it is difficult for the designer to determine whether one or the other should be used. Thus, in the case of the photosensitive element which receives light externally of the objective, there is an inherent inaccuracy in that the image angle is different from and does not coincide with the image angle through the objective used for actual exposure of the film. As a result it is unavoidable that there will be a light measurement error, which may be of considerable significance when using a camera having interchangeable objectives with different image angles. This is the case in a single lens reflex camera.

On the other hand, the internal photosensitive element which receives light which has already passed through the objective is capable of providing a far more accurate measurement of the light so that any light-measurement errors due to non-coincidence of the image angles of the objective and the light-receiving element are eliminated. Thus, with this latter type of construction it is unnecessary to design an external photosensitive element so that it will operate properly with only one given objective and will unavoidably have inaccuracies with other objectives. However, the internal photosensitive element had the disadvantage of necessitating a construction and control which are far more complex than those necessitated by the external photosensitive type of element. With the internal photosensitive element it becomes necessary to provide a far more complex electrical circuit for exposure control as determined by the light measurement, and particularly in the case of a single lens reflex camera it is often necessary to provide a device for temporarily storing or memorizing the extent of illumination of the object from an instant immediately before the shutter is released until the shutter operation is completed.

In this latter connection, it is to be noted that in a single lens reflex camera where there is an internal measurement of light which has passed through the objective, this light is reflected by the tiltable mirror toward the viewfinder so that it will not reach the film, and it is this light which is reflected by the mirror which is measured internally. As a consequence, immediately subsequent to tilting up of the mirror in order to make the exposure with opening of the shutter, the mirror becomes displaced to a location beyond the path of light passing through the objective, and thus it is not possible with this type of construction to continue to measure the light once the mirror has been tilted out of the path of light entering the objective. The result is that there is an interruption in the measurement of the light, this interruption lasting for the interval required for the mirror to tilt upwardly and for the film to be exposed. It is therefore essential with cameras of this latter type to provide circuitry capable of memorizing the information pertaining to the intensity of the light at the object which is to be photographed, and this memorized information is then used to control the exposure time. For example, it is known to use in structures of this latter type memory capacitors which are initially charged, before the mirror is tiled upwardly, to an extent determined by the intensity of the light at the object to be photographed, and this requirement of a memory capacitor with the additional electrical components and circuitry required to charge the memory capacitor according to the light intensity and to take from the memory capacitor the stored charge so as to expose the film properly creates the above necessity for the complex electrical circuitry used in connection with storing or memorizing the extent of illumination of the object, in the case of a single lens reflex camera. These problems are not present with an external photosensitive element. The external photosensitive element can continuously receive the light, up to the instant of and during the actual exposure of the film, so that all of the above problems inherent in the use of measurement of light internally in a single lens reflex camera are eliminated with the use of the external photosensitive element.

Summing up, the situation is that with a external photosensitive element it is possible to maintain the entire construction far simpler and less expensive than a camera having an internal photosensitive element, but this is done at the price of sacrificing accuracy particularly in the case of interchangeable objectives. On the other hand, while a high degree of accuracy can indeed be maintained with the internal photosensitive element which receives light which has passed through the objective, this latter type of element necessitates a far more expensive and complex construction, so that the costs are unavoidably increased with this type of construction.

SUMMARY OF THE INVENTION

It is accordingly a primary object of the present invention to provide a camera with a construction which takes advantage of both of the above-types of photosensitive elements.

Thus, it is a more particular object of the present invention to provide a camera capable of utilizing the simplicity of structure which results from the use of an external photosensitive element while at the same time maintaining the accuracy which results from the use of an internal photosensitive element.

Furthermore, it is an object of the present invention to provide a camera which can automatically determine exposure time not only in accordance with light received by internal and external photosensitive elements but also according to other exposure-determining factors such as the particular speed of the film which is to be exposed and the particular exposure aperture which results from the setting of the diaphragm.

It is also an object of the present invention to provide a camera with construction capable of achieving these objects without requiring the operator to learn a type of camera operation different from that which is conventionally used and while at the same time maintaining the entire organization simple, compact, and relatively inexpensive without any sacrifice in accuracy.

According to the invention an external photosensitive means is provided for receiving light which is external to the camera objective. An electrical means is operatively connected with this external photosensitive means to be actuated thereby for determining the exposure time in accordance with the light which is received by this external photosensitive means. An internal photosensitive means is provided for receiving internal light which has passed through the interior of the objective. This internal photosensitive means is operatively connected with the electrical means to provide for the latter a compensating signal which will compensate for inaccuracies inherent in determination of the exposure time solely by the external photosensitive means. As a result it becomes possible to achieve the accuracy inherent in the use of an internal photosensitive means while maintaining the low costs inherent in the simplicity of the structure resulting from the use of an external photosensitive means.

BRIEF DESCRIPTION OF DRAWINGS

The invention is illustrated by way of example in the accompanying drawings which form part of this application and in which:

FIG. 7 is a fragmentary sectional diagrammatic representation of the manner in which the pair of photosensitive means are arranged, FIG. 7 also illustrating schematically how parts of the electrical means are actuated when the shutter is actuated; and FIGS. 8–10 are respectively schematic front elevations of cameras provided with controls of the type illustrated in FIGS. 2, 5, and 6.

DESCRIPTION OF PREFERRED EMBODIMENTS

Figure 1:
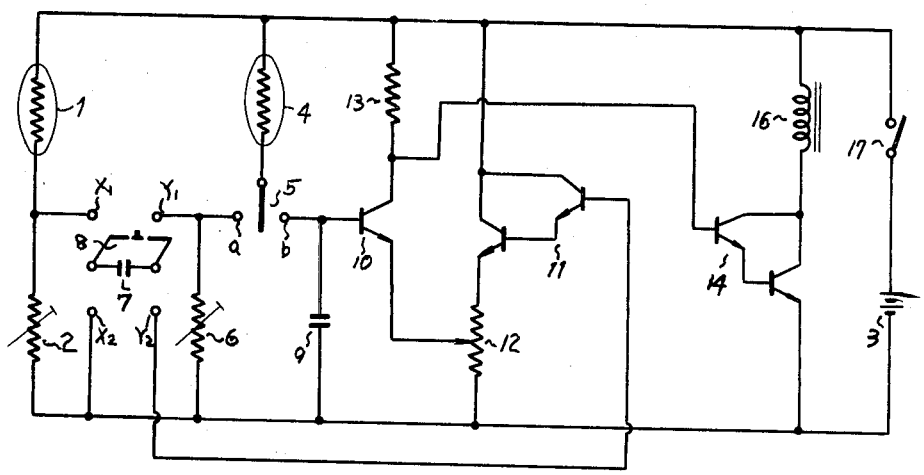
FIG. 1 is a diagrammatic representation of an electrical means and a pair of photosensitive means of the invention.

Referring first to FIG. 1, the structure illustrated therein includes an internal photosensitive means 1 shown at the upper left portion of FIG. 1, taking the form, for example, of a photosensitive resistor situated within a camera in the path of light which has passed through the objective. Thus, referring to FIG. 7 it will be seen that there is diagrammatically illustrated therein a camera housing 30 provided with an objective 32. Light which travels along the optical axis 34 is received by the photosensitive means 1 which is positioned in the manner schematically illustrated in FIG. 7. In the case of a single lens reflex camera this is the light which is directed up through the viewfinder before the exposure is made, and of course it is this very same light which is used to expose the film. The electrical means of the invention includes in the embodiment of FIG. 1 all of the structure illustrated therein with the exception of the internal photosensitive means 1 and the external photosensitive means 4. This external photosensitive means also takes the form of a photosensitive resistor, for example. It is situated, for example, in the manner shown schematically in FIG. 7, behind a window 36 formed in the front wall of the camera housing 30, so that light traveling along the axis 38, externally of the objective 32, will be received by the photosensitive resistor 4.

The electrical means shown in FIG. 1 includes an adjustable resistor 2 connected in series with the photosensitive means 1 and capable of being adjusted to a given value. This resistor 2 is connected in series with the battery 3.

The external photosensitive means 4 is connected to a control switch 5 which normally has a closed position engaging the contact $a$. This switch 5 is also shown in FIG. 7. Thus, as may be seen from FIG. 7 there is a diagrammatic representation of a spring urging the switch 5 to its normal position engaging the contact $a$.

Through this normal position of the control switch 5, the photosensitive means 4 is connected in series with a second adjustable resistor 6 which is preset to provide for the electrical means a resistance to achieve the required accurate results.

The electrical means further includes a capacitor 7 which operates to measure the difference between the light received by the pair of photosensitive means 1 and 4, and this capacitor 7 will memorize or store this differential at least temporarily so as to provide in this way a compensating signal as determined by the difference between the light received by the pair of photosensitive means 1 and 4.

This capacitor 7 is controlled by way of a capacitor switch means 8 which normally has the position engaging the pair of contacts $X_1$ and $Y_1$, so that in the normal position of the switch means 8 the capacitor 7 is connected between the internal photosensitive means 1 and the external photosensitive means 4 not only through the switch means 8 but also through the control switch means 5 which normally engages the contact $a$. The switch means 8 forms a double-throw switch capable of connecting the capacitor 7 to the other pair of contacts $X_2$ and $Y_2$.

The contact $X_2$ is connected electrically with the negative pole of the battery 3 while the contact $Y_2$ is connected to the base of a high-input impedience, current-control transistor means 11. The electrical means further includes a timing capacitor 9 which is connected electrically with the external photosensitive means 4 when the control switch means 5 is switched over to its other position engaging the contact $b$. At this time the timing capacitor 9 will be connected in series between the photosensitive means 4 and the battery 3.

The electrical means also includes a trigger-transistor means 10 connected into the circuit so that the voltage across a timing capacitor 9 is applied to the control pole thereof, while the emitter of the transistor 10 has applied thereto a bleeder voltage of the battery 3 determined by the output terminal of the amplifying transistor 11 and the potentiometer 12 which can be adjusted according to the speed of the film which is exposed in the camera. Thus, the variable resistor formed by the potentiometer 12 is capable of introducing into the controls the exposure-determining factor of the film speed.

The junction between the collector of the trigger-transistor means 10 and the collector resistor 13 is electrically connected with a switching transistor means 14. In the current supply circuit of the battery 3, and under control of the switching transistor 14, there is the series-connected electromagnetic means 16 which maintains the shutter open as long as this electromagnetic means 16 is energized. A main switch 17 is provided for closing or opening the entire circuit and is common to all of the current supply circuits of the battery 3.

Referring to FIG. 7, there is diagrammatically illustrated therein a shutter-actuating means in the form of a plunger 40 which is depressed in opposition to the spring 42 by the operator when it is desired to make an exposure. In order to make an exposure the bottom end of the plunger 40 will engage the tripping lever 42 or the like of a camera shutter 44 which may, for example, be a focal plane shutter in the case of a single lens reflex camera. Once the shutter has been tripped so as to expose the film it is maintained open by the electromagnetic means 16 and automatically closes when the electromagnetic means 16 becomes unenergized.

As may be seen from FIG. 7, during the initial part of the movement of the shutter-actuating means 40, a projection 46 thereof will engage the double-throw switch 8 so as to move the latter from its normal position shown in FIG. 7 engaging the contacts $X_1$ and $Y_1$ to its other position engaging the contacts $X_2$, $Y_2$. The left end of the arm of the switch 8 has, for example, a roller engaging the right surface of the cam 46 so that the switch will be maintained at the contacts $X_2$, $Y_2$ during continued depression of the plunger 40 by the operator.

As the shutter-actuating means 40 continues to move downwardly, as viewed in FIG. 7, a second cam 48 thereof will engage the switch 5 so as to displace the latter from its normal position engaging the contact $a$ to its other position engaging the contact $b$. This engaging of the contact $b$ by the switch 5 takes place simultaneously with the tripping of the shutter 44 by the shutter-actuating means 40.

In FIGS. 2–6 the components which perform the same functions as those of FIG. 1 are designated by the same reference characters.

Figure 2:
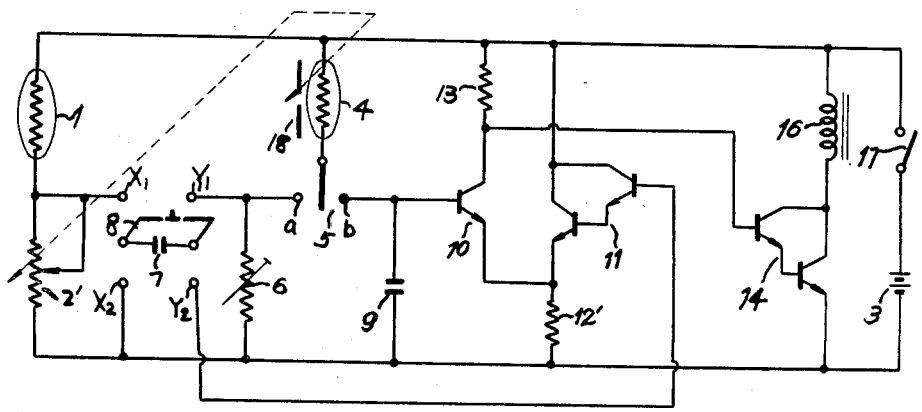
FIG. 2 is a diagrammatic representation of another embodiment of the structure of the invention.

Thus, referring to FIG. 2, in this embodiment an adjustable means 18 is diagrammatically shown in front of the external photosensitive means 4. This adjustable means takes the form of a diaphragm 18, and this adjustable diaphragm 18 is also diagrammatically illustrated in FIG. 8. It is capable of being manipulated by the operator so as to introduce a predetermined value of an exposure-determining factor by influencing the amount of light which is received by the external photosensitive means 4. Thus, by way of this diaphragm 18 it is possible to introduce the factor of the speed of the film which is exposed or the size of the exposure aperture.

As is diagrammatically illustrated in FIG. 2, the variable resistor 2' takes the form of a potentiometer mechanically coupled with the diaphragm 18 so as to be adjusted simultaneously with the latter.

Thus, the potentiometer 2' of FIG. 2, which is connected in series with the internal photosensitive means 1, will be automatically adjusted when the diaphragm 18 is adjusted so as to adjust the electrical means in accordance with the setting of the diaphragm 18.

FIG. 2 shows a fixed resistor 12' forming the emitter resistor of the trigger-transistor means 10. However, this resistor 12' may be replaced by a variable resistor in the form of a potentiometer or the like, for example, in the event that it is desired to introduce in this way into the circuit an exposure-determining factor as is the case with the potentiometer 12 of FIG. 1. This factor will be that one which is not introduced by the diaphragm 18. Thus, if the diaphragm 18 of FIG. 2 is used to introduce the size of the exposure aperture, the variable resistor 12 will be used to introduce the film speed, while if the diaphragm 18 is used to introduce the film speed the variable resistor 12 would be used to introduce the size of the exposure aperture.

Figure 3:
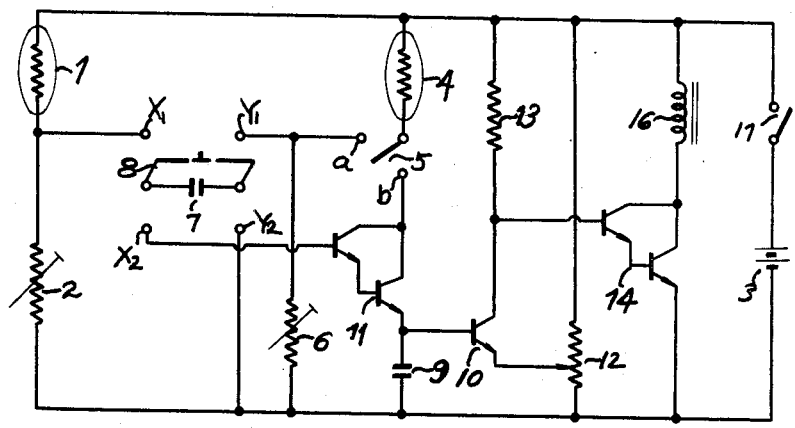
FIG. 3 is a further diagrammatic representation of an electrical means and a pair of photosensitive means of the invention, as used to determine automatically the exposure time.

In the embodiment of the invention which is illustrated in FIG. 3, the current-controlling transistor means 11 is positioned in the electrical means between the external photosensitive means 4 and the timing capacitor 9.

Figure 4:
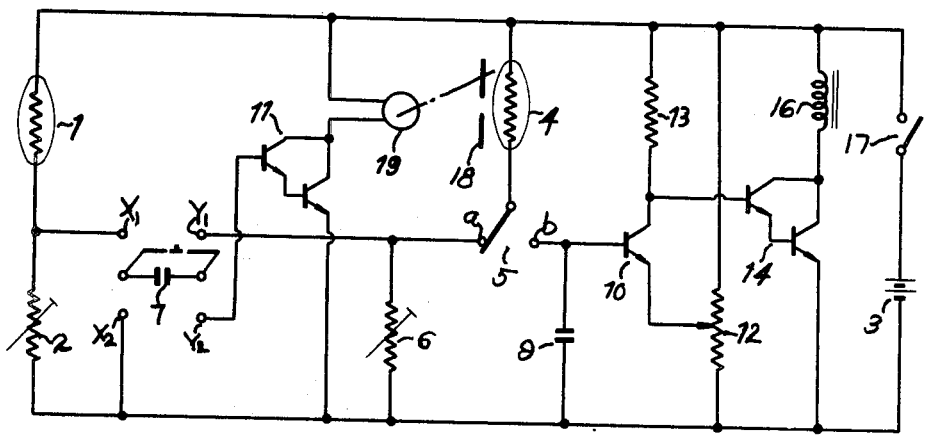
FIG. 4 illustrates yet a further variation of the electrical means.

With the arrangement of FIG. 4, the current-controlling transistor means 11 is connected directly to the battery 3 and is in series with an electric meter 19, which is mechanically coupled with the adjustable means 18 which takes the form of a diaphragm, as pointed out above. This meter 19 has a moving coil, for example, which turns to actuate a mechanical transmission which will automatically adjust the diaphragm 18.

Figure 5:
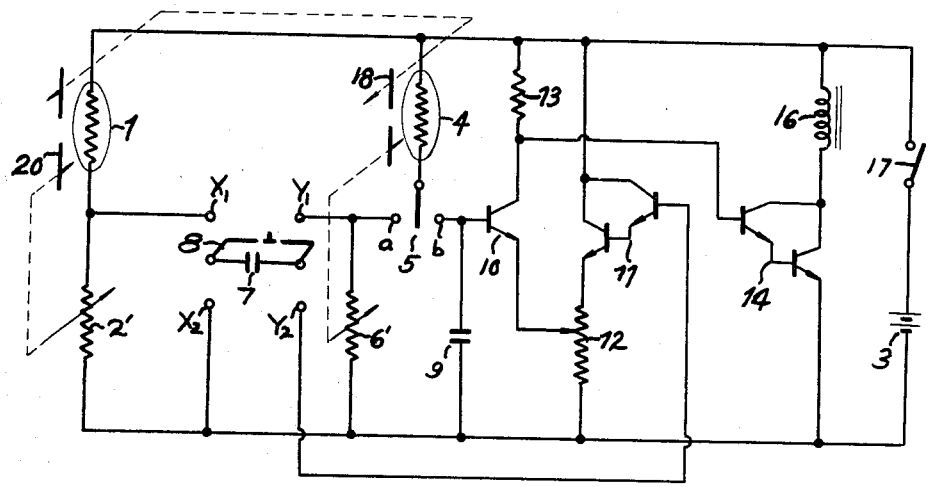
FIGS. 5 and 6 respectively illustrate still further embodiments of structures according to the invention.
Figure 6:
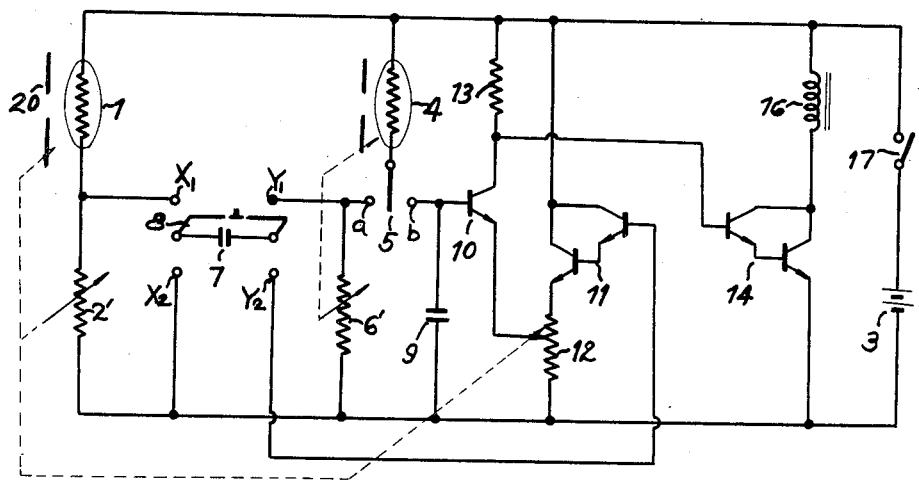

FIGS. 5 and 6 illustrate further embodiments of the invention. In both of these embodiments the variable resistor 2' is connected in series with the internal photosensitive means 1 and is automatically adjusted upon adjustment of the diaphragm 20 to determine the exposure aperture. This diaphragm 20 is situated at the objective 32 as schematically illustrated in FIGS. 9 and 10. Thus, the amount of light which is received by the internal photosensitive means 1 is adjusted simultaneously with the variable resistor 2'. In FIGS. 5 and 6 there is also a diaphragm 18 situated in the path of the light which reaches the external photosensitive means 4. In FIGS. 5 and 6 this diaphragm 18 is mechanically coupled with the variable resistor 6' so as to adjust the circuit according to the setting of the diaphragm 18. This resistor 6' is of course in series with the photosensitive means 4 when the switch 5 is in its normal position engaging the contact $a$. The diaphragm 18 is separate from the diaphragm 20 in the case of FIG. 6, as is schematically illustrated in FIG. 10. However, in the case of FIG. 5, the diaphragms 18 and 20 are coupled together, as is schematically shown in FIG. 9. Thus, in the case of FIG. 6 it is possible to use the diaphragm 18 to introduce into the electrical means the factor of film speed. In the case of FIG. 5, however, the diaphragm 18 is coupled with the diaphragm 20 so as to be adjusted simultaneously therewith. Thus, the diaphragm 18 of FIG. 5 will influence the external photosensitive means 4 according to the size of the exposure aperture. In the case where the diaphragm 18 is used for film speed, as indicated in FIG. 6, the transmission from the diaphragm 20 is coupled additionally to the emitter resistor 12 of the trigger-transistor means 10 to adjust the resistor 12 according to the exposure aperture set by the diaphragm 20.

The above-described structure operates as follows:

Referring to FIG. 1 where the basic arrangement of the invention is illustrated, the potentiometer 12 is initially adjusted according to the speed of the film which is exposed, or it may be adjusted according to the size of the exposure aperture which is set into the camera with the diaphragm thereof. Then the main switch 17 is closed so that the circuits will be supplied from the battery 3, and the operator directs the camera toward the object which is to be photographed. The light from the object which travels through the objective, and which is the same light that reaches the film during exposure, is received by the internal photosensitive means 1, while external light is received by the external photosensitive means 4, in the manner described above and shown schematically in FIG. 7.

At this time the camera is in a condition preparatory to making an exposure. In this condition the switch 5 is in its normal position engaging the contact $a$. Also, at this time the double-throw switch 8 is in its normal position engaging the contact $X_1$ and $Y_1$, as is also indicated in FIG. 7. Thus, it will be seen that at this time the electrical means of the invention places the capacitor 7 between the pair of photosensitive means 1 and 4, and of course at this time the pre-adjusted resistors 2 and 6 are also in the circuit. Therefore, there will be at this time across the terminals of the capacitor 7 the voltage which is applied across the points $X_1$ and $Y_1$, and this latter voltage is of course under the influence of the value of the resistance variation in accordance with the intensity of the light received by the photosensitive resistors 1 and 4. Because of the fact that the objective will provide a somewhat greater light loss than the window 36 through which the light reaches the photosensitive means 4, the voltage at point $X_1$ will be somewhat lower than the voltage at junction $Y_1$.

During the operations in connection with making an exposure, the operator will depress the plunger or button 40, and it will be noted that before the cam 48 can reach the switch 5 the cam 46 will reach the switch 8, so that during the first stage of depression of the shutter-actuating means 40 it is the double-throw switch 8 which is actuated so as to be displaced away from the contacts $X_1$ and $Y_1$ and into engagement with the contacts $X_2$ and $Y_2$. After this change-over of the position of the switch 8, the continued downward movement of the plunger or shutter-actuating means 40 will bring about actuation of the switch 5 by the cam 48 and simultaneous engagement of the tripping lever 42 of the shutter 44. Thus, at the moment when the shutter is released the switch 5 will engage the contact $b$. Therefore, a current controlled by the light which is received by the external photosensitive means 4 will flow to the timing capacitor 9, so that the voltage across the terminals thereof will rise with time. As is well known, the speed with which the voltage rises across the terminals of the capacitor 9 is determined by the intensity of the photocurrent, and accordingly by the resistance resulting in the photosensitive resistor 4 from the light which has been received thereby. Thus, the brightness of the object which is to be photographed has been sensed by the photosensitive means 4.

As a result of the change-over of the position of the switch 8, the base input of the current-controlling transistor means 11 which is the high input impedance transistor is biased through the voltage across the terminals of the capacitor 7 and controls the output current accordingly. Therefore, the emitter voltage $E_b$ of the trigger transistor means 10 is determined by the adjusted resistance value of the potentiometer 12 inserted in series in the current-control circuit of the transistor means 11. The triggering operation point of the trigger transistor means 10 with respect to the voltage rising across the terminals of the timing capacitor 9 is determined by this emitter voltage $E_b$.

The trigger transistor means 10 becomes conductive when the rising voltage across the terminals of the timing capacitor 9 reaches the trigger operation point, as determined by the emitter voltage, and thus by the magnitude of the differential between the light intensities received by the external photosensitive means 4 and the internal photosensitive means 1, this differential being temporarily stored or memorized by the capacitor 7. Of course the light received by the photosensitive means 1 is in fact the very same light which reaches the film during exposure thereof. At this instant, which is to say when the trigger transistor means becomes conductive, the switching transistor means 14, to the base of which is applied the voltage at the junction of the collector of transistor means 10 and the collector resistor 13, changes over to its non-conductive state from its conductive state, so that the electromagnet 16, which previously prevented the shutter from closing because of the energizing current reaching the electromagnetic means 16 through the conductive transistor 14, now becomes unenergized and the shutter closes.

Therefore, according to the basic operation which is achieved with the present invention, the bias voltage of the switching transistor means 14 is automatically regulated by a compensation signal for the signal which is received by the external photosensitive means 4. Of course, this compensation signal is obtained by way of the internal photosensitive means 1. A proper exposure is achieved with this compensation of the invention as a result of the automatic variation of the triggering voltage level relative to the rising voltage across the terminals of the timing capacitor 9, based upon the illumination signal achieved from the external photosensitive means 4 during the exposure operations.

With the embodiment of FIG. 2, the fundamental operation described above in connection with FIG. 1 is carried out with the only difference being that an adjustable means 18 is situated in front of the photosensitive means 4. This arrangement is also illustrated schematically in FIG. 8. The adjustable means 18 takes the form of an adjustable diaphragm which is capable of changing the size of the aperture through which light reaches the photosensitive means 4. This diaphragm 18 may be adjusted according to the speed of the film which is exposed or in accordance with the exposure aperture which is set into the camera at the objective thereof. Thus, the light which is received by the photosensitive means 4 will in this way be influenced in accordance with one of these exposure-determining factors. Therefore, with this latter factor thus being introduced into the operation, the signal received from the photosensitive means 4 will take into account not only the illumination of the object which is to be photographed but also the particular exposure-determining factor whether it be the speed of the film or size of the exposure aperture. Coupled with the adjustable diaphragm 18 is the potentiometer 2' which replaces the adjustable resistor 2 shown in FIG. 1. It is this potentiometer 2' which is in series with the photosensitive means 1, and the adjustment simultaneously with the diaphragm 18 brings about a compensation signal, temporarily memorized by the capacitor 7, which corresponds only to the difference between the light received by the photosensitive means 1, on the one hand, and the photosensitive means 4, on the other hand. In other words by coupling the adjustment of the potentiometer 2' to the adjustment of the diaphragm 18, the influence on the differential recorded at the capacitor 7 by the diaphragm 18 is eliminated.

Therefore, with the embodiment of FIG. 2 also, the compensating signal derived from the photosensitive means 1 will assure a proper exposure time in response to the level of the triggering voltage. Thus, an accurate precise exposure is assured. In the event that the fixed resistor 12' of FIG. 2 is replaced by a variable resistor such as a potentiometer 12 as illustrated in FIG. 1, adjusted either according to film speed or exposure aperture, whichever one is not set into the camera by way of the diaphragm 18, then the exposure time control operations will be carried out taking into account these two exposure-determining factors.

Referring now to FIG. 3, it will be noted from the above description that in this case the current-controlling transistor means formed by the high input impedance transistor 11 is inserted between the external photosensitive means 4 and the timing capacitor 9, and of course the transistor means 11 is the one which is under the control of the capacitor 7 which temporarily memorizes, in the form of the voltage across its terminals, the differential between the light received by the photosensitive means 1 and the light received by the photosensitive means 4, as mentioned above. Thus, the current flowing to the timing capacitor 9 is controlled not only by the external photosensitive means 4 but also by the current controlling transistor means 11 and thus corresponds to the illumination at the external photosensitive means 4, compensated by the illumination at the internal photosensitive means 1. Therefore, in this example the time required for the rise of the voltage across the terminals of the timing capacitor 9 is determined according to an illumination signal which is compensated before it reaches the timing capacitor 9. Of course the value of the voltage across the terminals of the timing capacitor 9 will bring about the triggering of the transistor 10. The transistor 10 will then bring about the change-over of the transistor 14 from its non-blocking to its blocking or non-conductive condition, so that the instant when the electromagnetic means 16 becomes unenergized is brought about with an exposure time which takes into account the light actually received by the film itself. In this way this embodiment also will achieve an extremely accurate exposure time.

With the embodiment of FIG. 4 the current-controlling transistor means 11 is in the circuit between the capacitor 7 and the meter 19 which through a suitable transmission drives the adjustable means forming the diaphragm 18. Thus, in this case the timing capacitor 9 will receive current, as regulated by the photosensitive resistor 4, which has already been compensated by the signal from the capacitor 7. Thus, in this case the compensation signal is used to adjust the diaphragm 18 so that the control of the amount of light reaching the photosensitive means 4 is directly compensated with the embodiment of FIG. 4. In this way also an extremely accurate exposure time control is achieved, as was the case with the above embodiments.

Referring to FIG. 5, the objective diaphragm 20 is adjusted to determine the exposure aperture. Thus, the light which reaches the internal photosensitive means 1 is influenced by this adjustment. Therefore, the light from the object which is received by the photosensitive means 1 is influenced by the size of the exposure aperture. The aperture of the diaphragm 18 which is in front of the photosensitive means 4 is automatically adjusted by a mechanical coupling with the diaphragm 20 so that the amount of light which reaches the photosensitive means 4 is restricted or influenced in precisely the same way as the light which reaches the photosensitive means 1. This mechanical coupling is illustrated in FIG. 9, where, for example, the rotary rings of the diaphragms 18 and 20 form a pair of meshing gears. Thus, the pair of photosensitive means 1 and 4 are in this case influenced by the same apertures. These diaphragms 20 and 18 are also mechanically coupled with the variable resistors 2' and 6' so that the latter are also simultaneously adjusted, these resistors of course being in series with the pair of photosensitive means 1 and 4, respectively. With this operation the arrangement is such that the resistance variation is in a geometric progression with a common ratio 2, and the apertures provided by the pair of diaphragms 20 and 18 will result in incremental variations of the pair of photosensitive means 1 and 4. In correspondence with these incremental variations there are incremental variations of the values of the variable resistors 2' and 6'. As a result the voltage at point $X_1$, as determined by the resistance of the photosensitive resistor 1 and the variable resistor 2', and the voltage at the point $Y_1$, as determined by the resistance of the photosensitive resistor 4 and the variable resistor 6', correspond only to the intensity of the illumination sensed by the pair of photosensitive means 1 and 4. Accordingly, the signal which is temporarily memorized and stored in the capacitor 7 is the signal of the error between the internally light-receiving type and externally light-receiving type of structure, as was the case with the embodiment of FIG. 1. Thus, in the example of FIG. 5 also an extremely precise and fully accurate exposure time control is achieved with the signal which is derived from the capacitor 7 serving as the compensating signal. Since in this case the resistance of the external photosensitive resistor 4 is controlled by the adjustment of the diaphragm 18, the control of the charging current of the timing capacitor 9 results in this timing operation being carried out with this additional condition of the aperture magnitude which is regulated by the diaphragm 18.

In the case of FIG. 6, there is an objective diaphragm 20 in the same way as in FIG. 5. However, in this case this diaphragm is not coupled with the diaphragm 18 which is in front of the photosensitive means 4. Thus, this type of construction is schematically illustrated in FIG. 10. However, with FIG. 6 the adjustment of the control derived from the external photosensitive means 4 is made by adjustment of the triggering voltage level of the trigger transistor means 10 in relation to the timing capacitor 9, as was the case with the above embodiments, except that in this case this control is further influenced by the setting of the diaphragm 18 independently of the setting of the diaphragm 20. Therefore, with the embodiment of FIG. 6 it is possible to introduce into the operation by way of the diaphragm 18, either the exposure-determining factor of the size of the exposure aperture or the exposure-determining factor of the film speed.

It will thus be seen that with the invention both an internal photosensitive means and an external photosensitive means are simultaneously directed toward the object which is to be photographed. The signal corresponding to the difference between the illuminations received by the pair of photosensitive means, or in other words the difference between the light received by the internal photosensitive means 1 and the light received by the external photosensitive means 4, is used to provide the compensating signal for correcting the timing operation derived from the light received by the external photosensitive means 4 with which the relatively simple circuitry described above is connected for achieving the automatic exposure time. It is accordingly possible with the invention to combine the advantageous functions of the internal photosensitive means with the advantages resulting from the simplicity of the structure associated with the external photosensitive means. Therefore, it is possible to arrive at a fully accurate exposure time with the high degree of accuracy resulting from an internal photosensitive means while maintaining the simplicity of the structure resulting from the use of an external photosensitive means. It is furthermore to be noted that with the invention it is possible to carry out the automatic exposure time operations while taking into account such additional exposure-determining factors as the size of the exposure aperture or the speed of the film, so that the controls are carried out not necessarily exclusively in connection with the illuminating conditions.

What is claimed:

1. In a camera, an objective, external photosensitive means for receiving light which is external to said objective, electrical means electrically connected with said external photosensitive means for automatically determining exposure time at least partly according to the light received by said external photosensitive means, actuation of said electrical means by said external photosensitive means alone having inherent inaccuracies due to the difference between light received by said external photosensitive means and light which has passed through said objective as well as the difference, if any, between the image angle of said external photosensitive means and the image angle of said objective, and internal photosensitive means for receiving the light which has passed through the objective internally thereof, said internal photosensitive means being electrically connected with said electrical means for providing a compensating signal which compensates at least partly for said inaccuracies inherent in actuation of said electrical means by said external photosensitive means alone.

2. The combination of claim 1 and wherein said electrical means includes a capacitor electrically connected between said external and internal photosensitive means for introducing into said electrical means the difference between the light received by said external photosensitive means and the light received by said internal sensitive means.

3. The combination of claim 2 and wherein said electrical means includes a capacitor switch electrically connected with said capacitor and a control switch electrically connected with said external photosensitive means, said capacitor switch and control switch normally being connected in series between said external and internal photosensitive means for normally maintaining said capacitor in a position for receiving a signal corresponding to the difference between the light received by said external and internal photosensitive means, and shutter-actuating means and a camera shutter to be actuated thereby, said shutter-actuating means coacting with said capacitor and control switches for first actuating said capacitor switch to disconnect said capacitor from said external and internal photosensitive means and connect it, to the remainder of said electrical means and for then actuating said control switch to connect said external photosensitive means to the remainder of said electrical means, said shutter-actuating means actuating said camera shutter simultaneously with actuation of said control switch.

4. The combination of claim 3 and wherein said electrical means includes a timing capacitor connected with said external photosensitive means when said control switch is actuated by said shutter-actuating means simultaneously with the camera shutter, current-control transistor means connected electrically with said first-mentioned capacitor when said capacitor switch is actuated by said shutter-actuating means, trigger transistor means connected electrically with said timing capacitor and current-control transistor means for providing a trigger signal according to the timing capacitor as influenced by said external photosensitive means, and said current-control transistor means, as influenced by the differential stored in said first-mentioned capacitor, electromagnetic means for maintaining the shutter open as long as said electromagnetic means is energized, and switching transistor means connected with said electromagnetic means for maintaining the latter energized as long as said switching transistor means remains conductive, said switching transistor means being operatively connected to said trigger-transistor means to be rendered non-conductive in response to a trigger signal from said trigger-transistor means, so that when said switching transistor means becomes non-conductive said electromagnetic means becomes unenergized and the shutter closes to terminate the exposure.

5. The combination of claim 4 and wherein a potentiometer is situated in said electrical means between said currentocontrol transistor means and said trigger-transistor means for introducing into the electrical means an exposure-determining factor different from exposure time.

6. The combination of claim 4 and wherein said trigger-transistor means is electrically connected directly with said external photosensitive means in parallel with said timing capacitor by said control switch when the latter is actuated by said shutter-actuating means.

7. The combination of claim 4 and wherein said current-control transistor means is electrically connected directly with said external photosensitive means by said control switch when the latter is actuated by said shutter-actuating means.

8. The combination of claim 4 and wherein an adjustable diaphragm is situated in the path of light received by said external photosensitive means for influencing the amount of light received thereby, and meter means electrically connected between said current-control transistor means and said adjustable diaphragm for automatically adjusting the latter according to a signal received from said current-control transistor means as influenced by said first-mentioned capacitor, to influence the amount of light received by said external photosensitive means in accordance with a compensating signal determined by the light received by said internal photosensitive means.

9. The combination of claim 1 and wherein an adjustable means coacts with said external photosensitive means for influencing the light received thereby according to an exposure-determining factor different from exposure time, and a variable resistor means forming part of said electrical means and connected with said adjustable means to be adjusted simultaneously therewith for eliminating from said electrical means a false influence which otherwise would be introduced by actuation of said adjustable means.

10. The combination of claim 9 and wherein said adjustable means is a diaphragm, and a second diaphragm coacting with the objective for determining the exposure aperture, said second diaphragm being electrically connected with the diaphragm which forms an adjustable means to bring about simultaneous adjustment of both diaphragms, and said electrical means including a second variable resistor means electrically connected with said second diaphragm to be actuated simultaneously therewith for eliminating a false influence which otherwise might be introduced by actuation of said second diaphragm.

11. The combination of claim 9 and wherein a diaphragm coacts with said objective for setting the exposure aperture, said electrical means including a pair of variable resistors both actuated simultaneously with said diaphragm for adjusting the electrical means according to the setting of said diaphragm, and a third variable resistor actuated by said adjustable means which coacts with said external photosensitive means.

* * * * *